US010634793B1

(12) United States Patent
Siao et al.

(10) Patent No.: US 10,634,793 B1
(45) Date of Patent: Apr. 28, 2020

(54) LIDAR DETECTION DEVICE OF DETECTING CLOSE-DISTANCE OBSTACLE AND METHOD THEREOF

(71) Applicant: AUTOMOTIVE RESEARCH & TESTING CENTER, Changhua County (TW)

(72) Inventors: Siang-Min Siao, Changhua County (TW); Ying-Ren Chen, Changhua County (TW); Li-You Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 14 days.

(21) Appl. No.: 16/231,789

(22) Filed: Dec. 24, 2018

(51) Int. Cl.
| | |
|---|---|
| *G06F 17/10* | (2006.01) |
| *G01S 17/931* | (2020.01) |
| *G08G 1/16* | (2006.01) |
| *G01S 7/48* | (2006.01) |
| *G06T 7/277* | (2017.01) |

(52) U.S. Cl.
CPC .......... *G01S 17/931* (2020.01); *G01S 7/4808* (2013.01); *G06T 7/277* (2017.01); *G08G 1/165* (2013.01); *G08G 1/166* (2013.01); *G06T 2207/10028* (2013.01)

(58) Field of Classification Search
CPC ..... G01S 17/931; G01S 7/4808; G08G 1/165; G08G 1/166; G06T 7/277; G06T 2207/10028
USPC ............ 701/41, 42, 301; 340/439; 342/109, 342/450; 348/118; 250/330, 208.1
See application file for complete search history.

(56) References Cited

U.S. PATENT DOCUMENTS

| | | | |
|---|---|---|---|
| 6,580,385 B1 * | 6/2003 | Winner | G01S 13/865 342/70 |
| 9,799,218 B1 * | 10/2017 | Gordon | B60W 30/18163 |
| 2013/0325311 A1 * | 12/2013 | Yoo | G08G 1/16 701/301 |
| 2014/0139374 A1 * | 5/2014 | Wellman | G01C 21/165 342/450 |
| 2014/0176714 A1 * | 6/2014 | Li | G08G 1/166 348/148 |
| 2014/0229069 A1 * | 8/2014 | Akiyama | B60T 7/12 701/41 |

(Continued)

FOREIGN PATENT DOCUMENTS

TW          I306818 B         3/2009

*Primary Examiner* — Shardul D Patel
(74) *Attorney, Agent, or Firm* — Rosenberg, Klein & Lee

(57) ABSTRACT

The lidar detection device uses four two-dimensional lidars to scan an obstacle, to obtain original point-cloud data corresponding to the obstacle, and the original point-cloud data includes a relative distance, a relative angle and a relative speed of the obstacle relative to the vehicle, Next, the point-cloud data is classified into at least one point-cloud group corresponding to the obstacle, and a border length of the obstacle is obtained according to a contour of the point-cloud group. Kalman filter and extrapolation are used to estimate and track a movement path of a dynamic obstacle, and transmit the relative speed and the border length of the dynamic obstacle to an automatic driving controlling device. According to the relative distance, a coordinate of the dynamic obstacle nearest the vehicle can be obtained and transmitted to the automatic driving controlling device efficiently.

14 Claims, 4 Drawing Sheets

(56) References Cited

U.S. PATENT DOCUMENTS

| | | | |
|---|---|---|---|
| 2014/0249722 A1* | 9/2014 | Hegemann | G08G 1/16 |
| | | | 701/41 |
| 2015/0336575 A1* | 11/2015 | Zeng | G08G 1/165 |
| | | | 701/41 |
| 2016/0036841 A1* | 2/2016 | Rodniansky | G06F 16/951 |
| | | | 713/187 |
| 2017/0021765 A1* | 1/2017 | Mori | B60Q 9/00 |
| 2018/0001876 A1* | 1/2018 | Oikawa | B60T 7/12 |
| 2018/0120434 A1* | 5/2018 | Jeong | G01S 7/4816 |
| 2019/0331775 A1* | 10/2019 | Song | G01S 7/4817 |

* cited by examiner

LIDAR DETECTION DEVICE OF DETECTING CLOSE-DISTANCE OBSTACLE AND METHOD THEREOF

BACKGROUND OF THE INVENTION

1. Field of the Invention

The present invention relates to an obstacle detection technology, and more particular to a lidar detection device of detecting distance obstacle, and a method thereof.

2. Description of the Related Art

An autonomous vehicle is an intelligent vehicle installed with a sensing system which is able to sense road environment and use the sensed road, vehicle position and obstacle information to control the driving parameters of the vehicle, thereby driving the autonomous vehicle safely and reliably on the road to reach a predetermined destination. Therefore, the autonomous vehicle applies computer, sensing, communication, sensorfusion, artificial intelligence and automatic control technologies, and becomes the focus of research in countries around the world.

The ambient sensors are indispensable devices in the autonomous vehicle, and include 77 G Hz radar, cameras, 24 GHz radar, three-dimensional (3D) lidar, and 2D lidar. Each type of sensor has its own advantages and disadvantages and can be configured according to the need of different driver assistance system. For example, the 77 G Hz radar is usually used for remote detection, and has a field of view (FOV) of 34 degrees and a blind spot within 2 meters, and is able to detect the distance of 100 meters away; however, but it is difficult for the 77 G Hz radar to establish an obstacle model accurately because of more noise and the limited FOV thereof. The camera is usually used for remote detection, and has FOV of 90 degrees and a blind spot within 10 meters, and is able to detect the distance of 80 meters away; however, the camera is affected easily by heavy rain, dense fog, strong light and weather. The 24 G Hz radar can be used for mid-distance detection, and has FOV of 80 degrees and is able to detect the distance of 40 meters away; however, the 24 G Hz radar is unable to capture the obstacle on the side (B-pillar) of the vehicle body, and the number of the obstacles detectable for the 24 G Hz radar is limited, and the data error of the 24 G Hz radar is as well as 77 G Hz radar which is harder to filter. The three-dimensional lidar can be used for mid-distance detection, and has FOV of 360 degrees, and is able to detect the position of 35 meters away, and has a blind spot within 3 meters. According to above-mentioned contents, radars and cameras are widely used in the autonomous vehicle but have drawbacks of more noise, high sensitivity to environmental factors and inability for close-distance detection. For this reason, the three-dimensional lidar with high reliability becomes popular in the field of autonomous vehicle. However, the amount of data generated by the three-dimensional lidar is the largest, so that a higher performance platform to process these data is necessary. When considering the overall sensors of autonomous vehicle, the platform which is arranged in pairs of 3D lidar will increases overall hardware cost.

Therefore, the present invention provides a lidar detection device of detecting a close-distance obstacle, and a method thereof, so as to solve the conventional problems.

SUMMARY OF THE INVENTION

The purpose of the present invention, is to provide a lidar detection device of detecting close-distance obstacle, and a method thereof. The lidar detection device can be performed by Kalman filter and extrapolation to estimate and to track a movement path of a dynamic obstacle, so as to decrease the required computation resource and quickly complement the defect caused by the two-dimensional lidar scanning absence of the obstacle. Furthermore, compared with the manner of providing the coordinate of the central point of the obstacle only, the lidar detection device and method of the present invention can provide a border length of the dynamic obstacle to facilitate estimation of obstacle collision probability.

Another purpose of the present invention is to provide a lidar detection device of detecting close-distance obstacle, and a method thereof. The lidar detection device applies a two-dimensional lidar having advantages of high data accuracy, broader field of view (FOV), and small blind spot, thereby improving the close-distance detection capability of the vehicle. Furthermore, the two-dimensional lidars are disposed on four corners of the vehicle and at two different heights to perform obstacle detection for a close-distance blind spot, thereby improving the detection accuracy.

In order to achieve the purposes, the present invention provides a lidar detection device of detecting close-distance obstacle, and the lidar detection device is disposed on a vehicle, at least one obstacle exists around the vehicle, and the lidar detection device comprises four two-dimensional lidars, a noise filter, and a processor. Two of the four two-dimensional lidars are disposed on a front end of the vehicle, the others of four two-dimensional lidars are disposed on a rear end of the vehicle, and the four two-dimensional lidars are configured to scan the at least one obstacle to obtain original point-cloud data corresponding to the at least one obstacle, and the original point-cloud data comprises a relative distance, a relative angle and a relative speed of the at least one obstacle relative to the vehicle. The noise filter is electrically connected to the four two-dimensional lidars, and configured to receive the original point-cloud data and filter out noise of the original point-cloud data, to generate filtered point-cloud data. The processor is electrically connected to the noise filter and an automatic driving controlling device disposed in the vehicle, and configured to receive the filtered point-cloud data. The processor classifies the filtered point-cloud data, by a preset length, into at least one point-cloud group corresponding to the at least one obstacle, and obtains a border length of the at least one obstacle according to a contour of the at least one point-cloud group, and when the relative speed of the at least one obstacle is changed during an preset time interval, the processor determines that the at least one obstacle is a dynamic obstacle, and the processor uses Kalman filter and extrapolation to estimate and track a movement path of the dynamic obstacle, and transmits the relative speed and the border length of the dynamic obstacle to the automatic driving controlling device. According to the relative distance of the dynamic obstacle, the processor obtains a coordinate of the dynamic obstacle nearest the vehicle, and transmits the coordinate to the automatic driving controlling device.

According to an embodiment, the extrapolation can be Lagrange polynomial interpolation and least squares.

According to an embodiment, when the relative speed is not changed during the preset time interval, the processor determines that the at least one obstacle is a static obstacle, and the processor transmits the relative distance of the static obstacle nearest the vehicle to the automatic driving controlling device.

According to an embodiment, a distance from the at least one obstacle to the vehicle can be below 20 m and above 0.3 m.

According to an embodiment, the two-dimensional lidars disposed on the front end of the vehicle are at different heights, and the two-dimensional lidars disposed on the rear end of the vehicle are at different heights.

In order to achieve the purposes, the present invention provides a lidar detecting method of detecting at least one obstacle around a vehicle. The lidar detecting method comprise following steps. First, four two-dimensional lidars are used to scan the at least one obstacle, to obtain original point-cloud data corresponding to the at least one obstacle. The original point-cloud data comprises a relative distance, a relative angle and a relative speed of the at least one obstacle relative to the vehicle. Next, the original point-cloud data is received, and noise of the original point-cloud data is filtered out to generate filtered point-cloud data. The filtered point-cloud data is received, and classified, by a preset length, into at least one point-cloud group corresponding to the at least one obstacle, and a border length of the at least one obstacle is obtained according to a contour of the at least one point-cloud group. It is determined whether the relative speed of the at least one obstacle is changed during a preset time interval, and when the relative speed of the at least one obstacle is changed during the preset time interval, the at least one obstacle is determined as a dynamic obstacle, and Kalman filter and extrapolation are used to estimate and track a movement path of the dynamic obstacle, and the relative speed and the border length of the dynamic obstacle are transmitted to an automatic driving controlling device which is electrically connected to the four two-dimensional lidars, and according to the relative distance of the at least one dynamic obstacle, a coordinate of the dynamic obstacle nearest the vehicle, can be obtained and the coordinate is transmitted to the automatic driving controlling device. When the relative speed of the at least one obstacle is not changed during the preset time interval, the at least one obstacle is determined as a static obstacle, and the relative distance of the static obstacle, which is nearest the vehicle, is transmitted to the automatic driving controlling device.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
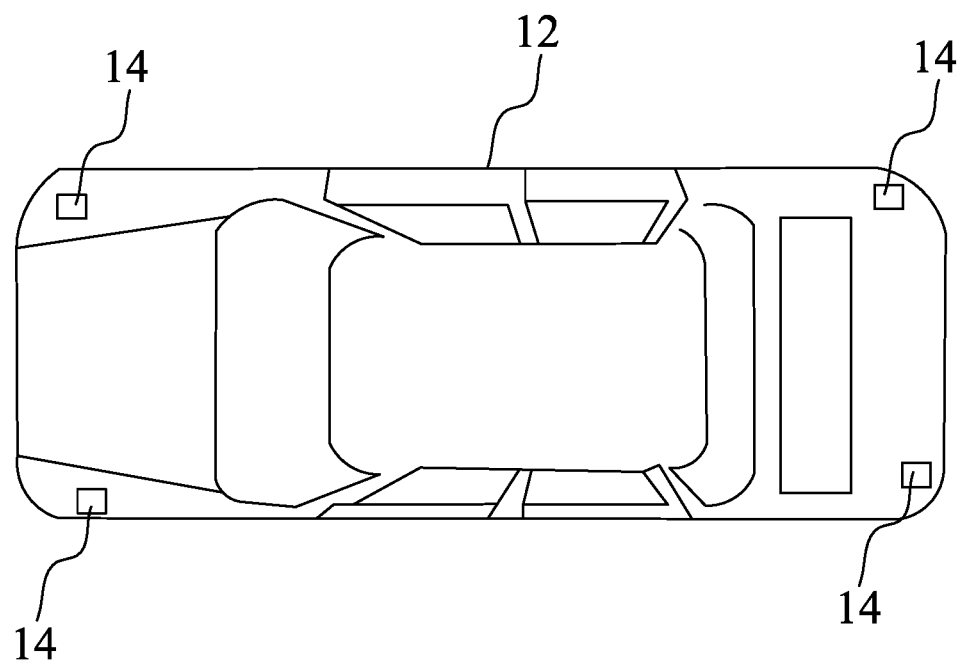
FIG. 1 is a schematic view of a two-dimensional lidar disposed on a vehicle, according to the present invention.

The following embodiments of the present invention are herein described in detail with reference to the accompanying drawings. These drawings show specific examples of the embodiments of the present invention. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 2:
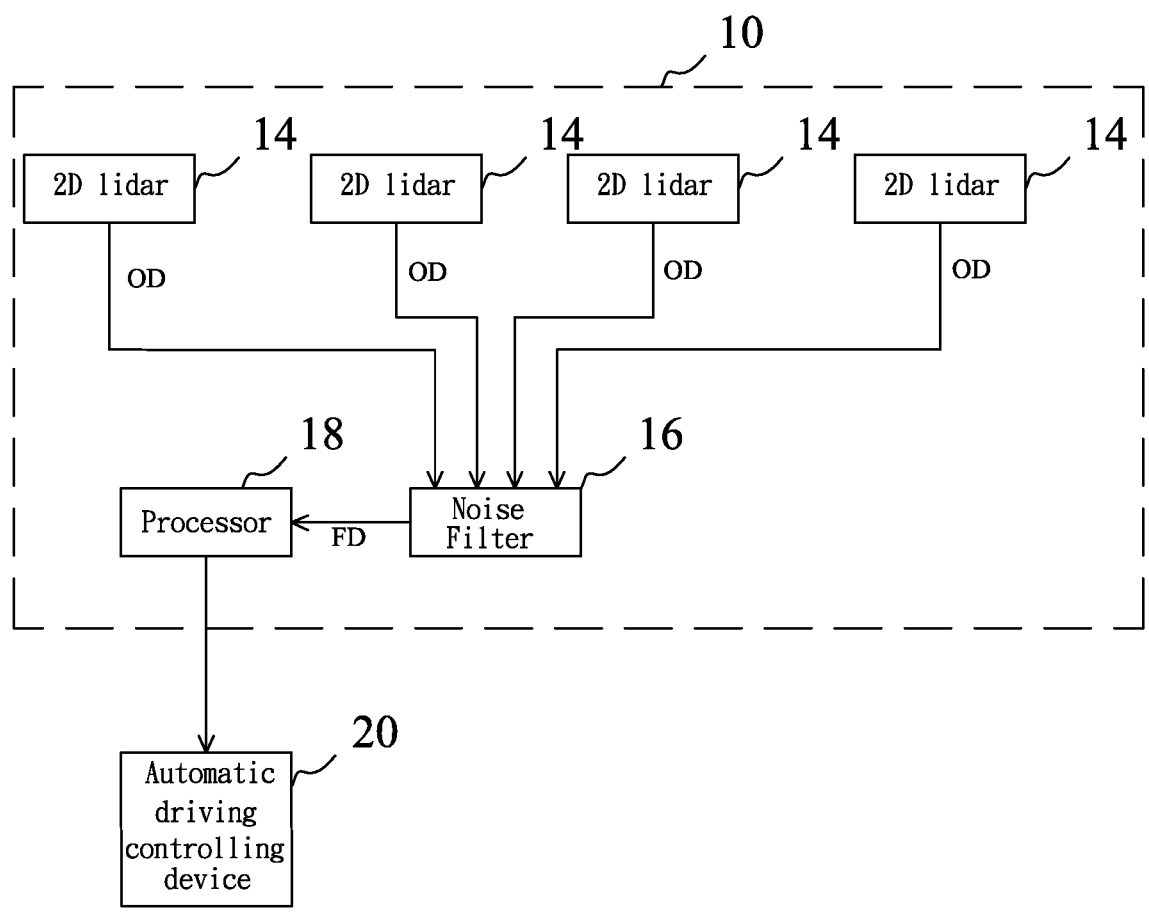
FIG. 2 is a block diagram of an embodiment of a lidar detection device of the present invention.
Figure 3:
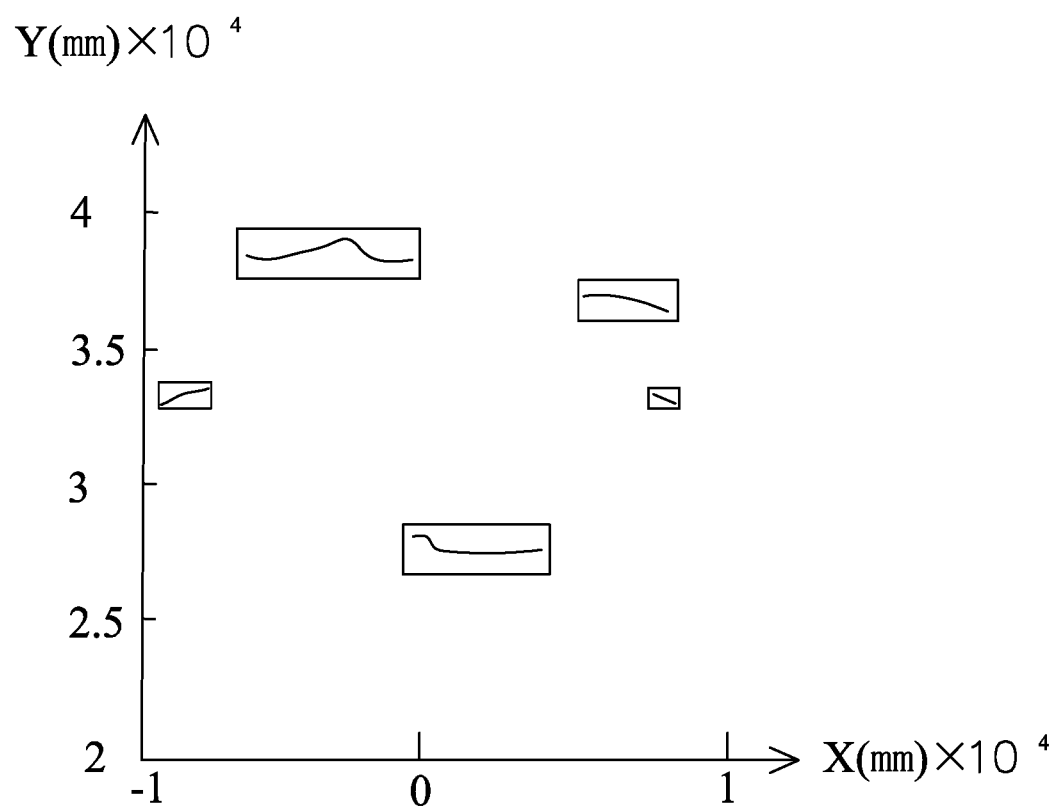
FIG. 3 is a distribution map of filtered point-cloud data of the present invention.
Figure 4:
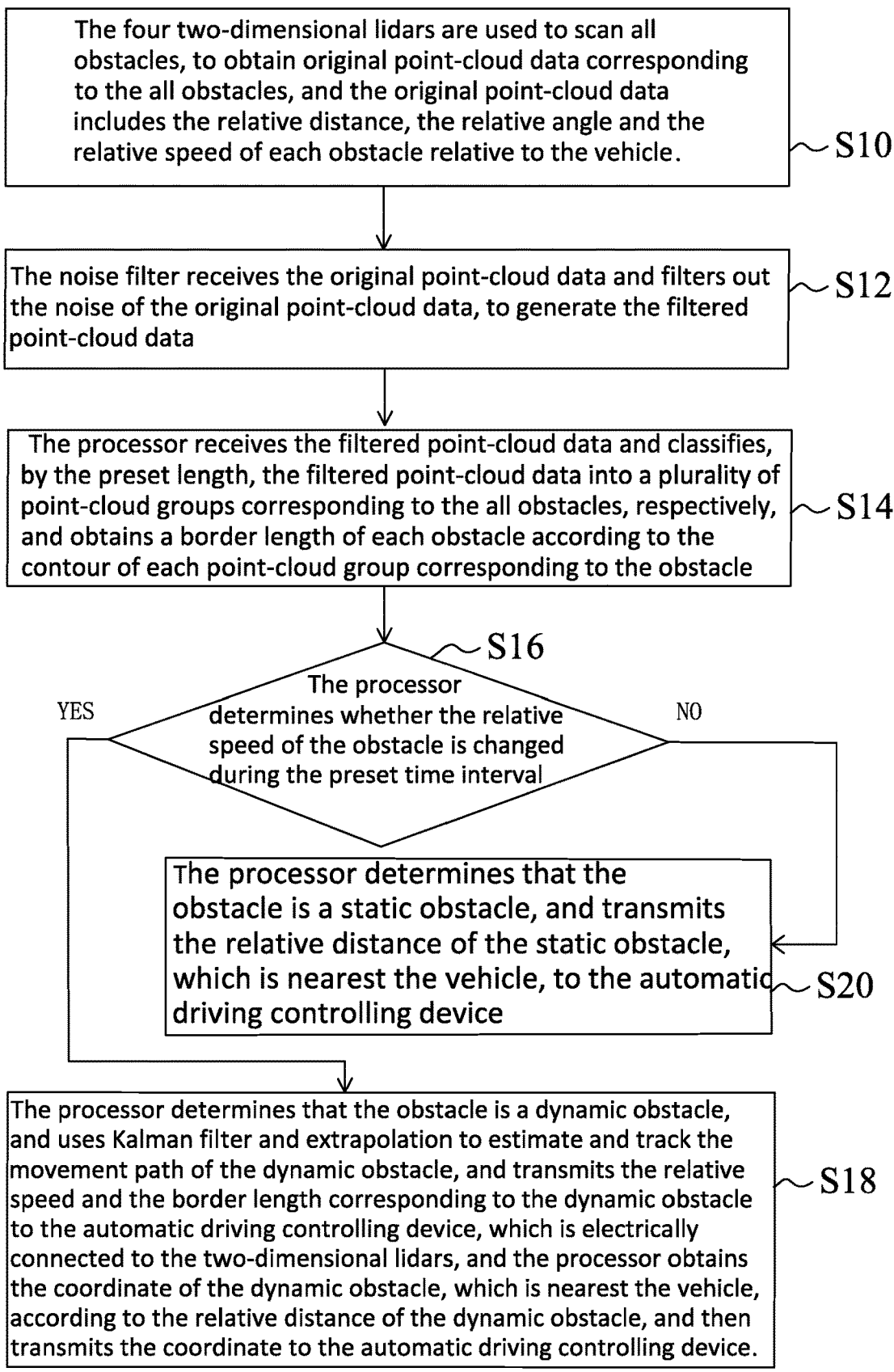
FIG. 4 is a flowchart showing the steps in an operation of an embodiment of a lidar detecting method of the present invention.

Please refer to FIGS. 1 to 3. The operation of a lidar detection device 10 of the present invention is introduced. The lidar detection device 10 can be disposed on a vehicle 12, and at least one obstacle exists around the vehicle 12, for example, multiple obstacles exist around the vehicle 12. A distance from each obstacle to the vehicle 12 is below 20 m and above 0.3 m. The lidar detection device 10 comprises at least four two-dimensional lidars 14, a noise filter 16 and a processor 18. The processor 18 includes a calculator and a classifier, and the noise filter 16 can be a linear filter or a nonlinear filter, for example, the linear filter can be a Gaussian filter, and nonlinear filter can be a median filter. In this embodiment, the number of the two-dimensional lidars 14 is four for exemplary illustration. The two-dimensional lidars 14 has high data accuracy, broad field of view and small blind spot, for example, the blind spot is within 0.3 m and the FOV is 270 degrees. The two-dimensional lidars 14 can detect the position from the two-dimensional lidar 14 by about 20 m distance, thereby improving the close-distance detection capability of the vehicle. As a result, the two-dimensional lidar can detect the blind spot of the three-dimensional lidar, so as to provide data more reliable than radar. Two of the four two-dimensional lidars 14 are disposed on a front end of the vehicle 12, and the others are disposed on a rear end of the vehicle 12. In order to prevent occurrence of the detection error when all two-dimensional lidars 14 are disposed at the same heights, for example, the detection error possibly occurs when the two-dimensional lidars 14 scan the space between tires of other vehicle and the lidar detection device 10 misjudges that there is no obstacle around, the two-dimensional lidars 14 on the front end of the vehicle 12 are disposed at different heights, and the two-dimensional lidars 14 on the rear end of the vehicle 12 are also disposed at different heights, so as to perform global detection. The two-dimensional lidars 14 are disposed on four corners of the vehicle. For example, the two-dimensional lidars 14 on the front end of the vehicle are disposed at heights of 75 cm and 25 cm from the ground, respectively, and the two-dimensional lidars 14 on the rear end of the vehicle are disposed at heights of 75 cm and 25 cm from the ground, respectively. All two-dimensional lidars 14 scan all obstacles to obtain original point-cloud data OD corresponding to the all obstacles, and the original point-cloud data OD includes a relative distance, a relative angle and a relative speed of the obstacle relative to the vehicle 12. The noise filter 16 is electrically connected to the two-dimensional lidars 14, and configured to receive the original point-cloud data OD and filter out noise of the original point-cloud data OD, so as to generate the filtered point-cloud data FD, thereby increasing accuracy of obstacle determination. The processor 18 receives the filtered point-cloud data FD, and classify, according to a preset length, the filtered point-cloud data FD into a plurality of point-cloud groups corresponding to the all obstacles, respectively; for example, as shown in FIG. 3, there are five point-cloud groups, and the preset length is, for example, 50 cm, and X indicates a distance in horizontal axe, Y indicates a distance in vertical axe. Since the distance between two pieces of the filtered point-cloud data FD belonged to the same obstacle is very close and usually below 50 cm, and the distance between two pieces of the filtered point-cloud data FD belonged to different obstacles is usually higher than 50 cm. In the other words, the five point-cloud group indicate that there are five obstacles located around the vehicle 12. The processor 18 obtains a border length of each obstacle according to a contour of each point-cloud group, to determine a size of each obstacle. When the relative speed of the obstacle is changed during a preset time interval, the processor 18 can determine that the obstacle is a dynamic obstacle, the processor 18 can use Kalman filter and extrapolation to estimate and track a movement path of the dynamic obstacle, and transmit the relative speed and the border length corresponding to the dynamic obstacle to an automatic driving controlling device 20 for further use. According to the relative distance of the dynamic obstacle, the processor 18 can obtain a coordinate of the dynamic obstacle nearest the vehicle 12, and transmit the coordinate to the automatic driving controlling device 20 for further use, so as to prevent collision between the vehicle and the dynamic obstacle. When the relative speed of the obstacle is not changed during the preset time interval, the processor 18 can determine that the obstacle is a static obstacle, and the processor 18 can transmit the relative distance of the static obstacle nearest vehicle 12 to the automatic driving controlling device 20 for further use, so as to prevent collision between the vehicle and the static obstacle.

The lidar detection device of the present invention can use the Kalman filter and the extrapolation to estimate and track the movement path of the dynamic obstacle in advance, so as to decrease computation resource and quickly complement the defect caused by the two-dimensional lidars 14 scanning absence of the obstacle. Furthermore, it is assumed that densities of the obstacles are the same, the volume of the obstacle is positively correlated with the mass of the obstacle and also positively correlated with the length of the obstacle, so the mass of the obstacle is positively correlated with the length of the obstacle. As a result, according to Newton's second law of motion, the mass of the obstacle is positively correlated with an acceleration of the obstacle, so that it can deduce that the acceleration of the obstacle is correlated with the length of the obstacle and the movement state of obstacle is also correlated with the length of the obstacle; in the other words, since a large-sized obstacle has a different acceleration from a small-sized obstacle, it causes that the estimated position of the obstacle is different from the actual position of the obstacle. For this reason, compared with the manner of providing the coordinate of the central point of the obstacle only, the present invention can provide the border length and the location range of the dynamic obstacle, to facilitate estimation of obstacle collision probability, thereby preventing collision between the vehicle 12 and the obstacle.

The operation of the lidar detection device 10 of the present invention is described in following paragraphs. In a step S10, the four two-dimensional lidars 14 are used to scan all obstacles, to obtain original point-cloud data OD corresponding to the all obstacles, and the original point-cloud data OD includes the relative distance, the relative angle and the relative speed of each obstacle relative to the vehicle 12. Next, in a step S12, the noise filter 16 receives the original point-cloud data OD and filters out the noise of the original point-cloud data OD, to generate the filtered point-cloud data FD. In a step S14, the processor 18 receives the filtered point-cloud data FD and classifies, by the preset length, the filtered point-cloud data FD into a plurality of point-cloud groups corresponding to the all obstacles, respectively, and obtains the border length of each obstacle according to the contour of each point-cloud group corresponding to the obstacle. In a step S16, the processor 18 determines whether the relative speed of the obstacle is changed during the preset time interval, and when the relative speed of the obstacle is changed during the preset time interval, the operational flow enters a step S18; when the relative speed of the obstacle is not changed during the preset time interval, the operational flow enters a step S20. In a step S18, the processor 18 determines that the obstacle is the dynamic obstacle, and uses the Kalman filter and extrapolation to estimate and track the movement path of the dynamic obstacle, and transmits the relative speed and the border length corresponding to the dynamic obstacle to the automatic driving controlling device 20, which is electrically connected to the two-dimensional lidars 14, and the processor 18 obtains the coordinate of the dynamic obstacle, which is nearest the vehicle 12, according to the relative distance of the dynamic obstacle, and then transmits the coordinate to the automatic driving controlling device 20. In a step S20, the processor 18 determines that the obstacle is the static obstacle, and transmits the relative distance of the static obstacle, which is nearest the vehicle 12, to the automatic driving controlling device 20.

The following paragraphs describe the Kalman filter used in the present invention, and the Kalman filter is implemented by equations (1), (2), (3), (4) and (5):

$$X_{k|(k-1)} = AX_{(k-1)} + Bu_{(k-1)} \quad (1)$$

$$P_{k|(k-1)} = AP_{(k-1)}A^T + Q \quad (2)$$

$$K_k = P_{k|(k-1)}H^T(HP_{k|(k-1)}H^T + R)^{-1} \quad (3)$$

$$X_k = X_{k|(k-1)} + K_k(z_k - HX_{k|(k-1)}) \quad (4)$$

$$P_k = (1 - K_k H)P_{k|(k-1)} \quad (5)$$

For example, k is an integer higher than or equal to 5, and the equation (1) is a state prediction equation. The (k−1)th time instant is earlier than the k-th time instant. $X_{k|(k-1)}$ is an estimated position of the obstacle at the k-th time instant according to the position of the obstacle at (k−1)th time instant, $X_k$ is a position of the obstacle at the k-th time instant, $X_{(k−1)}$ is a position of the obstacle at the (k−1)th time instant, A is a state transition matrix, $A^T$ is a transpose matrix of the state transition matrix, B is a control matrix, $u_{(k−1)}$ is a control vector at the (k−1)th time instant, $P_{k|(k−1)}$ is the covariance matrix, at the k-th time instant, estimated by using the covariance matrix at the (k−1)th time instant, Q is system noise, $P_{(k−1)}$ is a covariance matrix at the (k−1)th time instant, $K_k$ is a Kalman constant at the k-th time instant, H is an observation model, $H^T$ is transpose of the observation model, R is an observation error matrix, $z_k$ is a speed of the obstacle at the k-th time instant, $P_k$ is a covariance matrix at the k-th time instant, $P_{k|(k−1)}$ is a covariance matrix, at the k-th time instant, estimated by using the covariance matrix at the (k−1)th time instant.

For example, the extrapolation used in the present invention can be Lagrange polynomial interpolation and least squares method. A third-order interpolation is taken as example for illustration, the position f(t) of the obstacle can calculated by the equation (6) below:

$$f(t) = \frac{[(t+1) \times t]}{[(-2+1) \times (-2)]} \times X_{(k-2)} + \frac{[(t+2) \times t]}{[(-1+2) \times (-1)]} \times X_{(k-1)} + \frac{[(t+2) \times (t+1)]}{[(2) \times (1)]} \times X_k \quad (6)$$

wherein t is time, and when t=0, f(0)=$X_k$; when t=1, f(1) is $X_{(k+1)}$; when t=2, f(2) is $X_{(k+2)}$. $X_{(k−2)}$ is a position of the obstacle at the (k−2)th time instant, $X_{(k+1)}$ is a position of the obstacle at the (k+1)th time instant, and $X_{(k+2)}$ is a position of the obstacle at the (k+2)th time instant.

The least squares method is taken as example for illustration. An actual location f(t) of the obstacle can be calculated according to equation (7) below:

$$F(t) = at^2 + bt + c \quad (7)$$

wherein t is time, an error value $\|F(t)-X_t\|$ is equal to $\{[F(t)-X_t]^2\}^{1/2}$. Under a condition that t is k, (k−1), (k−2), (k−3) and (k−4), F(t) is determined as an optimal curve when a sum of $\|F(t)-X_t\|$ is minimum.

As a result, equations (8), (9) and (10) can be obtained in a sequential order:

$$\min \left( \sum_{t=k-4}^{k} \|F(t) - X_t\| \right) \quad (8)$$

$$\left( \sum_{t=k-4}^{k} (F(t) - X_t)^2 \right) \quad (9)$$

$$0 = \frac{\partial}{\partial a} \sum_{t=k-4}^{k} (F(t) - X_t)^2 \quad (10)$$

$$= \frac{\partial}{\partial b} \sum_{t=k-4}^{k} (F(t) - X_t)^2$$

$$= \frac{\partial}{\partial c} \sum_{t=k-4}^{k} (F(t) - X_t)^2$$

Since the values of $X_k$, $X_{(k−2)}$, $X_{(k−3)}$, and $X_{(k−4)}$ are known, parameters a b, c and f(t) can be obtained according to the equation (10). The future position of the obstacle can be obtained when t is (k+1) and (k+2), respectively.

According to above-mentioned content, the lidar detection device and lidar detection method of the present invention can apply the two-dimensional lidar having high data accuracy, broad field of view, and small blind spot, so as to improve the close-distance detection capability of the vehicle; furthermore, the lidar detection device and lidar detection method of the present invention use the two-dimensional lidars disposed at different heights, so as to achieve the effect of global detection.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A lidar detection device of detecting close-distance obstacle, wherein the lidar detection device is disposed on a vehicle, at least one obstacle exists around the vehicle, and the lidar detection device comprises:

four two-dimensional lidars, wherein two of the four two-dimensional lidars are disposed on a front end of the vehicle, the others of four two-dimensional lidars are disposed on a rear end of the vehicle, and the four two-dimensional lidars are configured to scan the at least one obstacle to obtain original point-cloud data corresponding to the at least one obstacle, and the original point-cloud data comprises a relative distance, a relative angle and a relative speed of the at least one obstacle relative to the vehicle;

a noise filter electrically connected to the four two-dimensional lidars, and configured to receive the original point-cloud data and filter out noise of the original point-cloud data, to generate filtered point-cloud data; and a processor electrically connected to the noise filter and an automatic driving controlling device disposed in the vehicle, and configured to receive the filtered point-cloud data, wherein the processor classifies the filtered point-cloud data, by a preset length, into at least one point-cloud group corresponding to the at least one obstacle, and obtains a border length of the at least one obstacle according to a contour of the at least one point-cloud group, and when the relative speed of the at least one obstacle is changed during an preset time interval, the processor determines that the at least one obstacle is a dynamic obstacle, and the processor uses Kalman filter and extrapolation to estimate and track a movement path of the dynamic obstacle, and transmits the relative speed and the border length of the dynamic obstacle to the automatic driving controlling device, and the processor obtains, according to the relative distance of the dynamic obstacle, a coordinate of the dynamic obstacle nearest the vehicle, and transmits the coordinate to the automatic driving controlling device.

2. The lidar detection device according to claim 1, wherein the noise filter is a linear filter or a nonlinear filter.

3. The lidar detection device according to claim 2, wherein the linear filter is a Gaussian filter.

4. The lidar detection device according to claim 2, wherein the nonlinear filter is a median filter.

5. The lidar detection device according to claim 1, wherein when the relative speed is not changed during the preset time interval, the processor determines that the at least one obstacle is a static obstacle, and the processor transmits the relative distance of the static obstacle nearest the vehicle to the automatic driving controlling device.

6. The lidar detection device according to claim 1, wherein the extrapolation is Lagrange polynomial interpolation and least squares.

7. The lidar detection device according to claim 1, wherein a distance from the at least one obstacle to the vehicle is below 20 m and above 0.3 m.

8. The lidar detection device according to claim 1, wherein the two-dimensional lidars disposed on the front end of the vehicle are at different heights, and the two-dimensional lidars disposed on the rear end of the vehicle are at different heights.

9. The lidar detection device according to claim 8, wherein the two-dimensional lidars disposed on the front end of the vehicle are disposed at heights of 75 cm and 25 cm from the ground, respectively, and the two-dimensional lidars disposed on the rear end of the vehicle are at heights of 75 cm and 25 cm from the ground, respectively.

10. The lidar detection device according to claim 1, wherein the preset length is 50 cm.

11. A lidar detecting method of detecting at least one obstacle around a vehicle, and the lidar detecting method comprise:
   using four two-dimensional lidars to scan the at least one obstacle, to obtain original point-cloud data corresponding to the at least one obstacle, wherein the original point-cloud data comprises a relative distance, a relative angle and a relative speed of the at least one obstacle relative to the vehicle;
   receiving the original point-cloud data, and filtering out noise of the original point-cloud data, to generate filtered point-cloud data;
   receiving the filtered point-cloud data, and classifying, by a preset length, the filtered point-cloud data into at least one point-cloud group corresponding to the at least one obstacle, and obtaining a border length of the at least one obstacle according to a contour of the at least one point-cloud group;
   determining whether the relative speed of the at least one obstacle is changed during a preset time interval;
   when the relative speed of the at least one obstacle is changed during the preset time interval, determining that the at least one obstacle is a dynamic obstacle, and using Kalman filter and extrapolation to estimate and track a movement path of the dynamic obstacle, and transmitting the relative speed and the border length of the dynamic obstacle to an automatic driving controlling device which is electrically connected to the four two-dimensional lidars, and obtaining, according to the relative distance of the at least one dynamic obstacle, a coordinate of the dynamic obstacle nearest the vehicle, and transmitting the coordinate to the automatic driving controlling device; and
   when the relative speed of the at least one obstacle is not changed during the preset time interval, determining that the at least one obstacle is a static obstacle, and transmitting the relative distance of the static obstacle, which is nearest the vehicle, to the automatic driving controlling device.

12. The lidar detecting method according to claim 11, wherein the extrapolation is Lagrange polynomial interpolation and least squares.

13. The lidar detecting method according to claim 11, wherein a distance from the at least one obstacle to the vehicle is below 20 m and higher than above 0.3 m.

14. The lidar detecting method according to claim 11, wherein the preset length is 50 cm.

* * * * *